M. Lewis,
Harvester-Cutter.
No. 78,460.        Patented June 2, 1868.
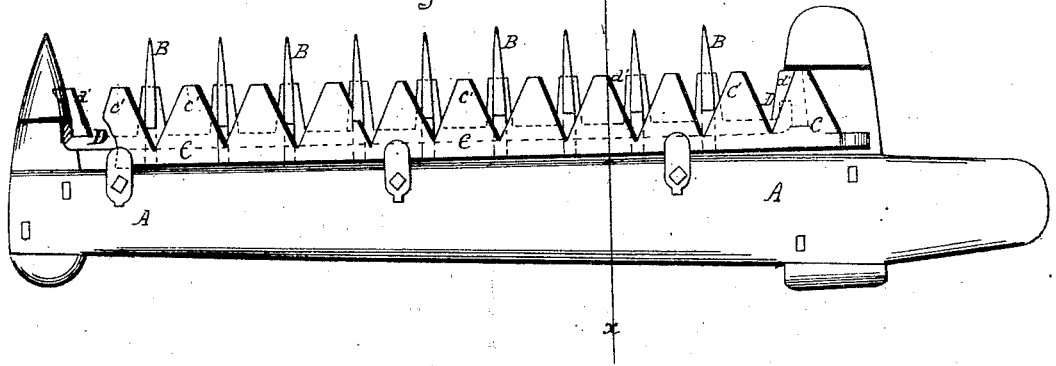
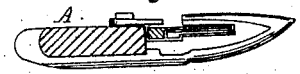
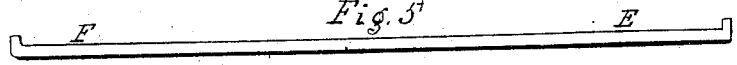
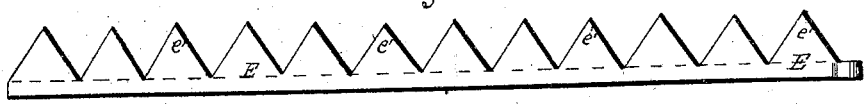
Witnesses.
W. C. Ashketto
J. A. Fraser
Inventor,
M. Lewis
per Munn & Co
Attorneys

UNITED STATES PATENT OFFICE

MOSES LEWIS, OF ODELL, ILLINOIS.

IMPROVEMENT IN HARVESTER-CUTTERS.

Specification forming part of Letters Patent No. 78,460, dated June 2, 1868.

*To all whom it may concern:*

Be it known that I, MOSES LEWIS, of Odell, in the county of Livingston and State of Illinois, have invented a new and Improved Combined Reaper and Mower; and I do hereby declare that the following is a full, clear, and exact description thereof, which will enable others skilled in the art to make and use the same, reference being had to the accompanying drawings, forming part of this specification.

Figure 1 is a top view of a sickle-bar with my improvement attached, parts being broken away to show the construction. Fig. 2 is a detail view of the guard-facing. Fig. 3 is a detail view of the grass-cutter bar. Fig. 4 is a detail cross-section, taken through the line $x\,x$, Fig. 1. Fig. 5 is a detail view of a bar to take the place of the guard-facing when said guard-facing is not used. Fig. 6 is a detail view of the grain-sickle bar.

Similar letters of reference indicate corresponding parts.

A is the finger-bar, which is constructed and attached to the machine in the ordinary manner. B are the guards or fingers, which are constructed and attached to the finger-bar A in the ordinary manner. C is the cutter-bar for cutting grass, which works in slots or grooves in the finger-bar A, and in the guards or fingers B, in the ordinary manner.

D is the guard-facing, which is placed in grooves or recesses in the guards or fingers B, so that it may be held securely in place while being used, and is made with teeth $d'$, which are so formed and arranged that they may coincide in position with and project a little upon each side of the guards or fingers B, as shown in Fig. 1. By this construction the guard-facing D may be removed when desired, and the teeth $d'$ ground, the grass being cut between the teeth or cutters $d'$ of the guard-facing and the teeth $c'$ of the cutter-bar C.

For cutting grain, the cutter-bar C and guard-facing D are removed and replaced by the cutter-bar E and the bar F, the said bar F being designed simply to occupy the space or recesses previously occupied by the bar of the guard-facing D. In this case the grain is cut between the teeth $e'$ of the cutter-bar E and the sides of the guards or fingers B. By means of this improvement the machine may be easily, quickly, and conveniently adjusted for cutting grain or grass, as may be desired.

I claim as new and desire to secure by Letters Patent—

The removable bars D F, adapted to be substituted one for the other in the same finger-bar, for reaping or mowing, as herein shown and described.

MOSES LEWIS.

Witnesses:
WM. HOSSOCK,
A. P. WRIGHT.